US012563047B1

(12) United States Patent
Jian et al.

(10) Patent No.: US 12,563,047 B1
(45) Date of Patent: Feb. 24, 2026

(54) NETWORK SECURITY BASED ON A DISTRIBUTED NETWORK ACCESS AND LOGICAL PERMISSION ARCHITECTURE

(71) Applicant: Amazon Technologies, Inc., Seattle, WA (US)

(72) Inventors: Yifan Jian, Kirkland, WA (US); Anirudhan Sudarsan, Everett, WA (US); Vimalanandan Thangamani, Everett, WA (US); Neelakantan Ganesan Sujatha, Redmond, WA (US); Amol Arvind Kothari, Redmond, WA (US); Apurva Maharishi, Great Neck, NY (US)

(73) Assignee: Amazon Technologies, Inc., Seattle, WA (US)

( * ) Notice: Subject to any disclaimer, the term of this patent is extended or adjusted under 35 U.S.C. 154(b) by 60 days.

(21) Appl. No.: 18/602,649

(22) Filed: Mar. 12, 2024

(51) Int. Cl.
*G06F 21/00* (2013.01)
*H04L 9/40* (2022.01)

(52) U.S. Cl.
CPC ........ *H04L 63/108* (2013.01); *H04L 63/0435* (2013.01); *H04L 63/102* (2013.01)

(58) Field of Classification Search
CPC .. H04L 63/108; H04L 63/0435; H04L 63/102
See application file for complete search history.

(56) References Cited

U.S. PATENT DOCUMENTS

| | | | | |
|---|---|---|---|---|
| 9,754,100 | B1 * | 9/2017 | Hitchcock | H04L 9/0891 |
| 10,055,557 | B2 * | 8/2018 | Son | H04W 12/50 |
| 11,418,504 | B1 * | 8/2022 | Celiesius | H04L 63/0272 |
| 11,777,917 | B2 * | 10/2023 | Erickson | H04L 63/12 |
| | | | | 726/7 |
| 12,177,185 | B1 * | 12/2024 | Ryland | H04L 63/102 |
| 2013/0124870 | A1 * | 5/2013 | Rosati | H04L 9/0847 |
| | | | | 713/168 |
| 2016/0057626 | A1 * | 2/2016 | O'Toole | G06Q 30/0226 |
| | | | | 726/4 |
| 2017/0013013 | A1 * | 1/2017 | Johansson | H04L 63/0869 |
| 2019/0251293 | A1 * | 8/2019 | Banerjee | G06F 21/6272 |
| 2020/0366653 | A1 * | 11/2020 | Caceres | H04L 63/0853 |
| 2024/0146721 | A1 * | 5/2024 | Jen | H04L 9/14 |

* cited by examiner

*Primary Examiner* — Kendall Dolly
(74) *Attorney, Agent, or Firm* — Kilpatrick Townsend & Stockton LLP

(57) ABSTRACT

Embodiments described herein can involve improved network security based on a distributed network access and logical permission architecture. In an example, a computer system can receive, by a first compute instance of the system from a user device, a request indicating an action to be performed on an element of a virtual resource. The first compute instance can be associated with a logical permission to use the virtual resource and may lack network access to the virtual resource. The first compute instance can cause a credential to be generated that enables the action to be performed on the element only and has an expiration attribute. The first compute instance can provide the credential to a second compute instance of the system which has network access to the virtual resource. The second compute instance can cause the action to be performed based on the credential and the network access.

20 Claims, 9 Drawing Sheets

Credential 210

Policy 402

Expiration Attribute 408

Location Attribute 409

Configuration Information 211

Object Information 404

Account Information 406

Cryptographic Key Information 410

Storage Location Indication 412

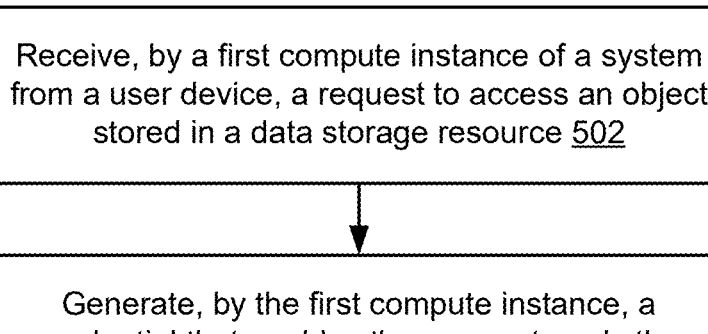

500

Receive, by a first compute instance of a system from a user device, a request to access an object stored in a data storage resource 502

Generate, by the first compute instance, a credential that enables the access to only the object and that has an expiration attribute 504

Instantiate, by the first compute instance, a credential that enables the access to only the object and that has an expiration attribute 506

Provide, by the first compute instance, the credential to the second compute instance 508

Retrieve, by the second compute instance, the object from the data storage resource based at least in part on the credential and the network access 510

Store, by the second compute instance, data from the object at a network storage location accessible to the user device 512

FIG. 5

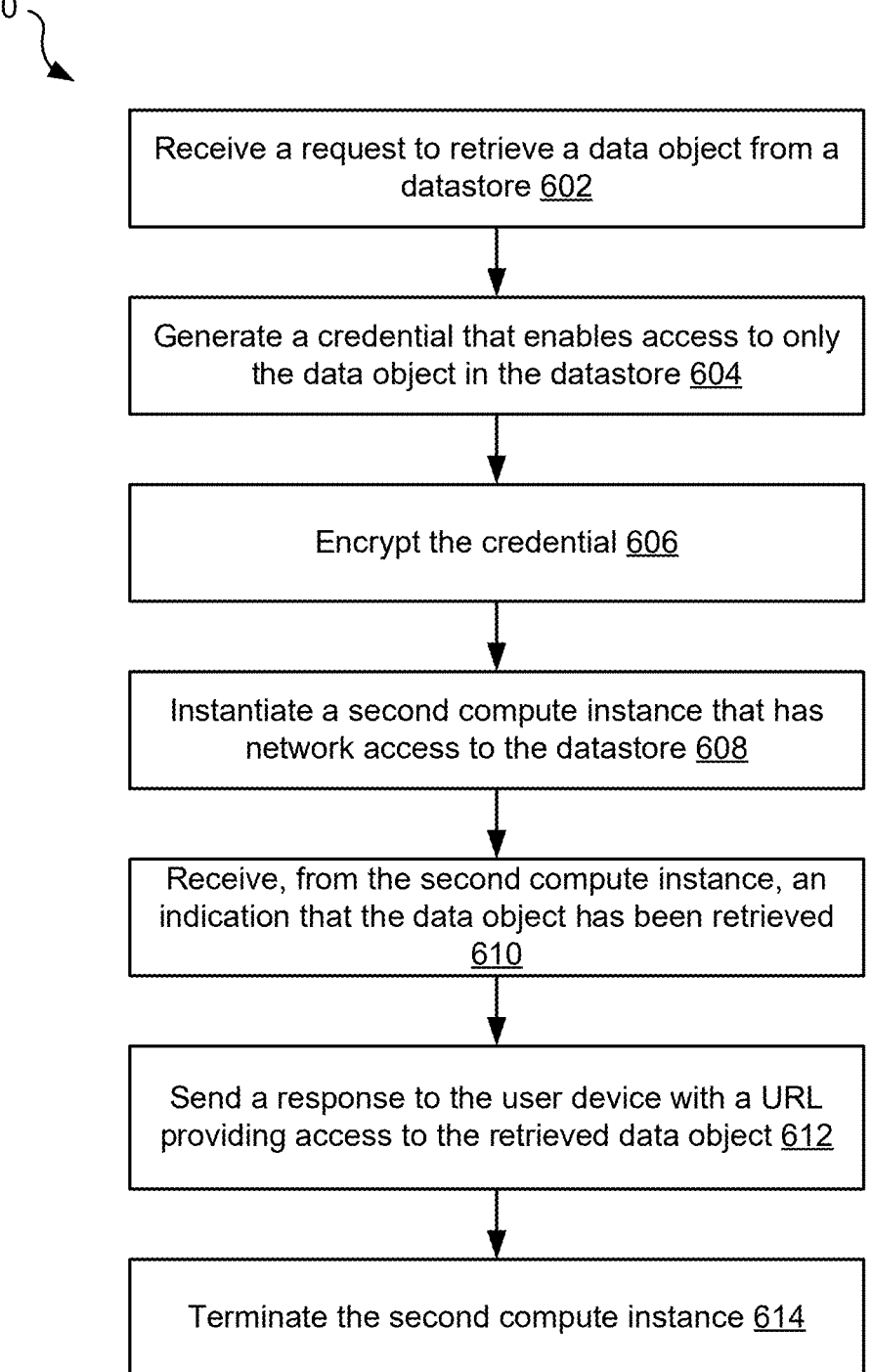

600

Receive a request to retrieve a data object from a datastore 602

Generate a credential that enables access to only the data object in the datastore 604

Encrypt the credential 606

Instantiate a second compute instance that has network access to the datastore 608

Receive, from the second compute instance, an indication that the data object has been retrieved 610

Send a response to the user device with a URL providing access to the retrieved data object 612

Terminate the second compute instance 614

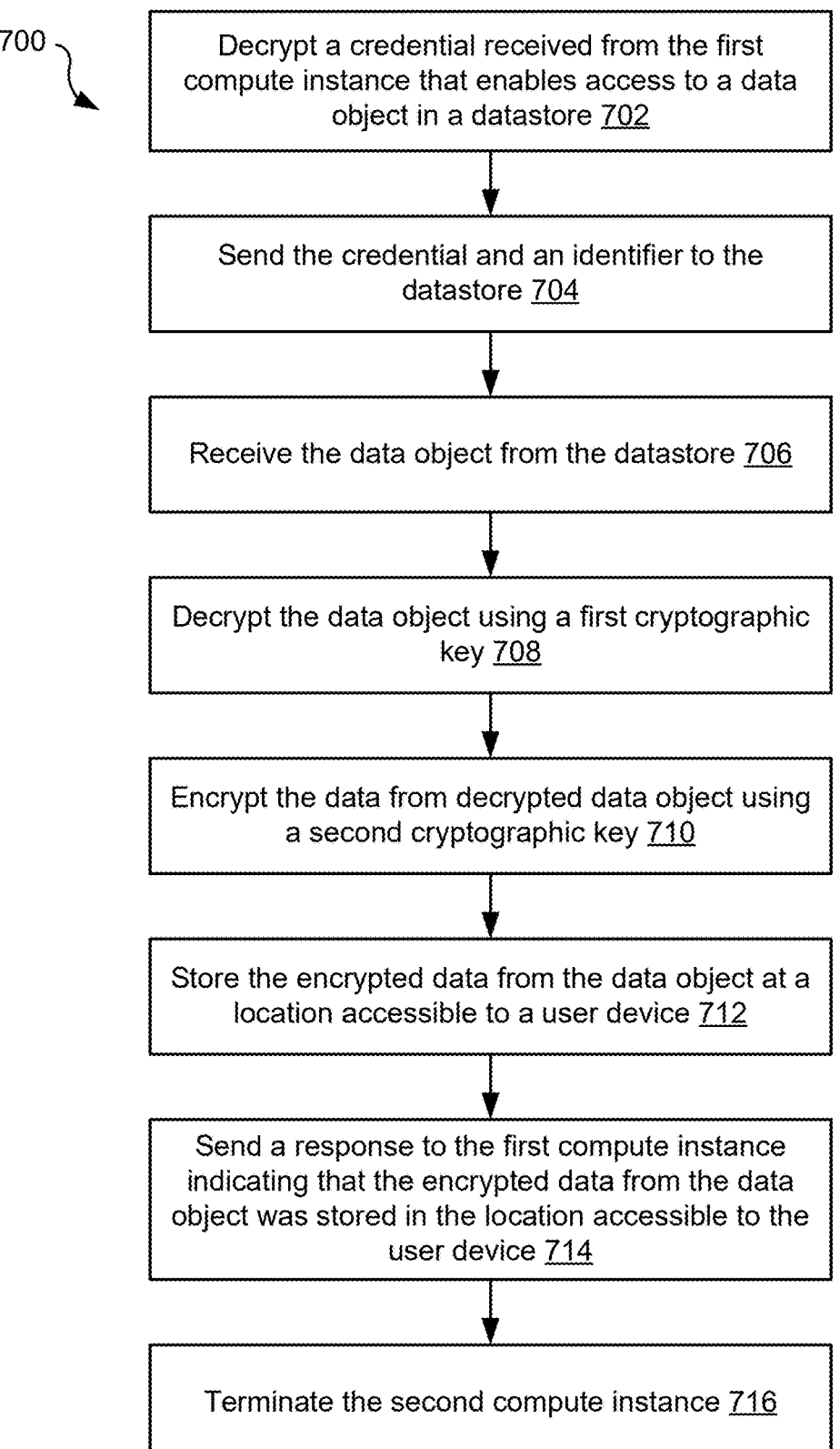

Decrypt a credential received from the first compute instance that enables access to a data object in a datastore 702

Send the credential and an identifier to the datastore 704

Receive the data object from the datastore 706

Decrypt the data object using a first cryptographic key 708

Encrypt the data from decrypted data object using a second cryptographic key 710

Store the encrypted data from the data object at a location accessible to a user device 712

Send a response to the first compute instance indicating that the encrypted data from the data object was stored in the location accessible to the user device 714

Terminate the second compute instance 716

Detect that an object has been accessed by the second compute instance 802

Yes

Does access by the second compute instance correspond to a request for access from a client? 804

No

Determine that the access is secure 806

Determine that the access is not secure 808

NETWORK SECURITY BASED ON A DISTRIBUTED NETWORK ACCESS AND LOGICAL PERMISSION ARCHITECTURE

BACKGROUND

Services can be provided through online systems with various processing components. Various methods may be used to perform a service. Each of the processing components may handle large amounts of data and be associated with access controls to secure the access to the data. Given the large data amounts, data related operations (e.g., write, read, etc.) may be associated with a processing latency. To be effective or relevant, certain service may need to be provided with a short processing latency, such as in real-time or near real-time, while access may still remain secure.

BRIEF DESCRIPTION OF THE DRAWINGS

Various embodiments in accordance with the present disclosure will be described with reference to the drawings, in which:

FIG. 5 illustrates an example flow of a process enabling access to an element of a virtual resource, according to an embodiment of the present disclosure;

FIG. 6 illustrates an example flow of a process performed by a first compute instance to enable access to an element of a virtual resource, according to an embodiment of the present disclosure;

FIG. 7 illustrates an example flow of a process performed by a second compute process to enable access to an element of a virtual resource, according to an embodiment of the present disclosure;

DETAILED DESCRIPTION

Figure 1:
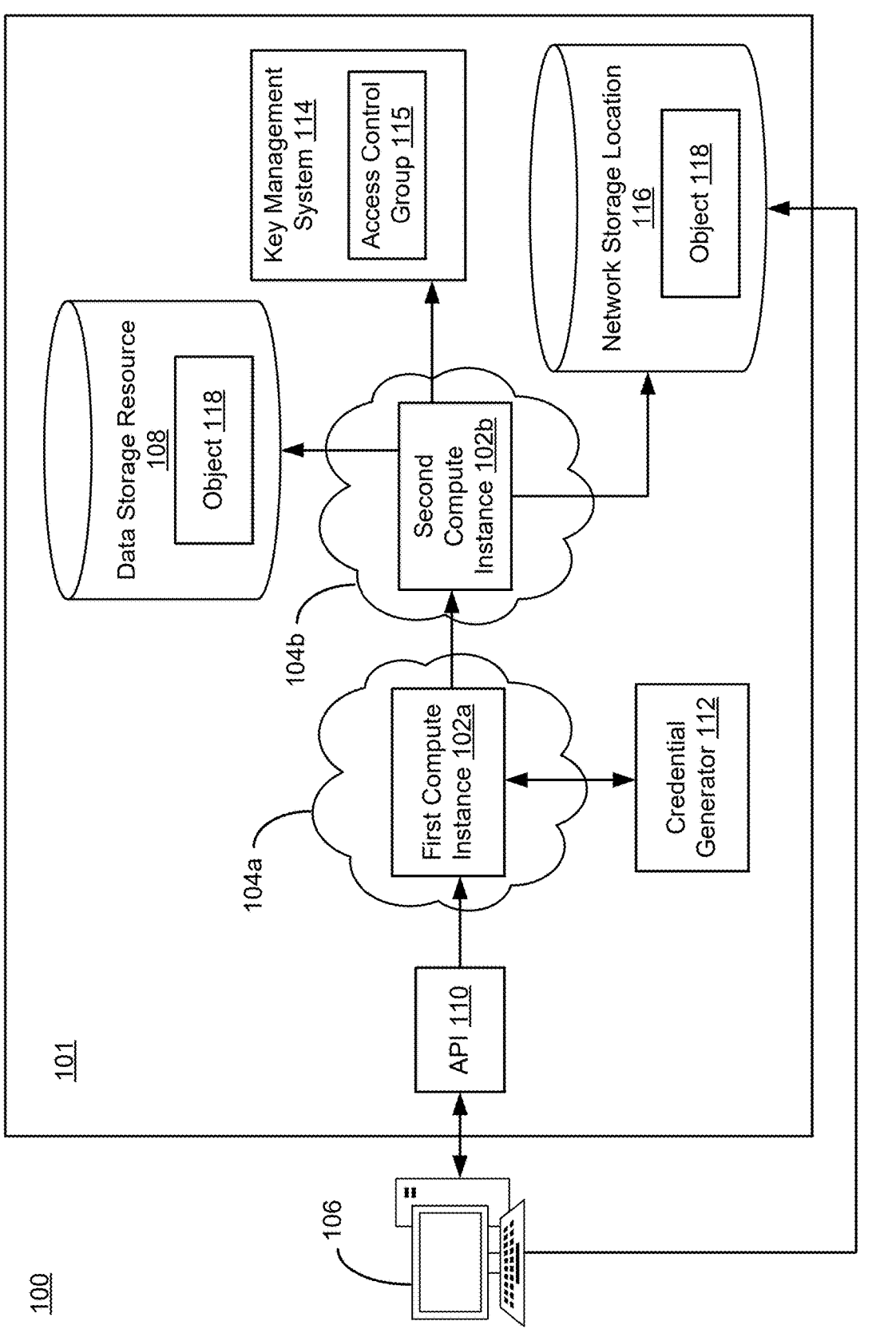
FIG. 1 illustrates an example computing environment with a first compute instance in a first private network with client access and a second compute instance in a second private network with backend storage access, according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a network architecture that can securely enable access to elements of virtual resources using a first compute instance and a second compute instance. Each of the first compute instance and the second compute instance can be included in their own, separate private network that have differing access controls. For example, the first compute instance may have a logical permission to use a virtual resource (e.g., can generate a credential required to access the virtual resource), but may not have network access to the virtual resource (e.g., does not have routing information to determine a network path to the virtual resource). The second compute instance may not have a logical permission to generate the credential but may have network access to the virtual resource. To provide a user device access to an element of the virtual resource, the first compute instance can receive a related request from the user device and generate a credential that enables the action to be performed in association with the element only (e.g., without enabling any actions to be performed in association with any other elements of the virtual resource). The credential may be ephemeral and may expire after a time limit (e.g., five minutes) or a certain number of uses (e.g., after one use). The first compute instance can also instantiate the second compute instance and provide the second compute instance with the credential. The second compute instance can use the network access and the credential to cause the action to be performed. Once the action is performed, the second compute instance can notify the first compute instance. At that point, the second compute instance can be terminated. The first compute instance can notify the user device. Such an architecture can prevent any single compute instance from having persistent access to elements of the virtual resource. This can help to accomplish no single point of failure in terms of persistent access.

Particularly, the access is separated between logical access and network access. The first compute instance is configured to have only logical access, whereas the second compute instance is configured to have only the network access. If one of the two compute instances are compromised (e.g., due to hacking activity), the access to the virtual resource may still be secure because the compromise would be limited to only one element and would be temporary. As such, the overall network security is increased by being more robust to compromises.

To illustrate, consider a distributed cloud environment that can store sensitive data and can perform privileged actions on the sensitive data by invoking services. For example, a multi-tenant service in the distributed cloud environment may store data across multiple datastores and tables that are encrypted using different encryption keys. To prevent any single compute instance from having privileged access to the data, the distributed cloud environment can include a first compute instance in a first virtual private network. The first compute instance can be client-facing and can handle requests but may not have network access to the stored data.

For example, a user device can send a request to the first compute instance to retrieve an encrypted image stored in one of the datastores. The first compute instance can authorize and authenticate the request for the encrypted image. The first compute instance may have logical access to the datastore. That is, the first compute instance may generate a credential used to grant access to the encrypted image in the datastore. The credential may be time-limited (e.g., for five minutes) and may only grant access to the encrypted image. In other words, no other data besides the encrypted image in the datastore can be accessed based on the usage of the credential. Because the first compute instance does not have network access to the datastore, the first compute instance can instantiate a second compute instance in a second virtual private network. The second compute instance may be pre-configured (e.g., via configuration information associated with the second virtual private network) to have network access to the datastore to perform sensitive operations, such as fetching or storing data, but may not be exposed to the user device. Additionally or alternatively, the datastore may have a resource-based policy that is configured to only allow access from the second virtual private network and/or the second compute instance. The second compute instance additionally may not have logical access to the datastore (e.g., may not be able to generate the credential to present the logical permission when requesting data to be read from or written to the datastore).

Once the first compute instance instantiates the second compute instance, the first compute instance can provide the credential and configuration information to the second compute instance. The configuration information may include non-sensitive information and the credential may include sensitive information. The configuration information generated by the first compute instance may include cryptographic key information for the encrypted image. The configuration information may be tenant specific and isolated (e.g., associated with a particular tenancy), but the tenancy may not be included in the configuration information. In some examples, the credential may include a username and password associated with the user device that enables access to the encrypted image (e.g., whereby the username and password are pre-associated with a permission for accessing the encrypted image). Before the credential expires, the second compute instance can use the username and password to retrieve the encrypted image from the datastore (e.g., by querying the datastore and presenting the credential as part of the querying). Then, the second compute instance can decrypt the encrypted image based on the cryptographic key information in the configuration information, such as by invoking a cryptographic service that determines, based on this information, relevant first cryptographic key to use. For example, the second compute instance can present the credential as part of a request to invoke the cryptographic service. The resulting decrypted, plain-text data for the image can be re-encrypted by the second compute instance using a second cryptographic key that is associated with the user device. Rather than transmitting the re-encrypted image directly to the user device, the second compute instance can store the re-encrypted image in a network storage location accessible to the user device. The first compute instance may not have network access or logical access to the network storage location accessible to the user device.

For example, after the second compute instance stores the re-encrypted image, the second compute instance can notify the first compute instance that the re-encrypted image has been stored. The first compute instance can terminate the second compute instance. This may increase security for the distributed cloud environment, as compute instances with network access to secure datastores may only exist for a short time as datastore actions are being performed. The first compute instance can also determine a uniform resource locator (URL) of the network storage location storing the re-encrypted image. The URL may be ephemeral and may expire after a predefined amount of time (e.g., five minutes). The first compute instance can provide the URL to the user device to complete the request. If the user device does not use the URL before the URL expires, the user device may not access the re-encrypted file. If the user device uses the URL before the URL expires, the user device may access the re-encrypted file. The user device can use the second cryptographic key to decrypt the re-encrypted file.

Embodiments of the present disclosure provide several technological advantages over existing systems. In a typical client-server model, clients of a service may not have direct access to a secure data store or to privileged actions that may be performed with respect to the data store. However, a compute instance associated with the service may have persistent and privileged access to all stored data. This can introduce security threats, as all stored data may be at risk if the compute instance is compromised (e.g., via data exfiltration). Embodiments of the present disclosure can architect the system with separate compute instances (possibly in different virtual private networks). Separating access permission and network access into different compute instances can ensure zero persistent compute access to critical data stored in backend storage. This can also reduce attack surface for malicious entities, as the compute instances handling critical data may only have access to one specific object requested by the user device. This can significantly reduce the blast radius of malicious events. For example, because credentials are limited to a single object, malware may be prevented from polluting other data. Further, the second compute instant may be instantiated solely to perform an action with respect to a single object and may be terminated once the action is completed, which can further limit access by a malicious entity.

In the interest of clarity of explanation, embodiments of the present disclosure may be described with respect to an object that is retrieved from a data storage resource. Embodiments of the present disclosure may similarly and equivalently apply to any action that may be performed with respect to an element of a virtual resource, such as writing data to storage, launching compute instances (e.g., virtual machines), modifying a network configuration, or any other suitable action (e.g., read, write, configure, launch, terminate, etc.) and/suitable element of a virtual resource (e.g., a data object, a compute instance, a configuration file, a virtual private network, etc.).

FIG. 1 illustrates an example computing environment 100 with a first compute instance 102a in a first virtual private network 104a with client access and a second compute instance 102b in a second virtual private network 104b with backend storage access, according to an embodiment of the present disclosure. A user device 106, which can include any appropriate device operable to send and receive requests, messages, information, etc. can communicate with the computing environment 100 over an appropriate network and convey information back to a user of the user device 106. Examples of such user devices include personal computers, cell phones, handheld messaging devices, laptop computers, set-top boxes, personal data assistants, electronic book readers, and the like.

The computing environment 100 can include one or more servers executing the first compute instance 102a and the second compute instance 102b. The computing environment 100 can also include an application programming interface (API) 110 that is externally visible to the user device 106. The API 110 can be hosted on a network gateway or server and can interface with the first compute instance 102a included in the first virtual private network 104a. The first virtual private network 104a and the second virtual private network 104b may be separate, virtualized networks in a virtualized network 101 (although it is possible that both compute instances 102a and 102b are members of the same virtual private network, such as via subnet-level isolation between the first compute instance 102a and the second compute instance 102*b*). Each of the first virtual private network 104*a* and the second virtual private network 104*b* may have differing access controls. For example, the first virtual private network 104*a* may be configured with network access to the API 110 and to a credential generator 112, while also being configured without network access to the data storage resource 108. The second virtual private network 104*b* may be configured without access to network access to the API 110 or the credential generator 112, while also being configured with network access to the data storage resource 108, a key management system 114, and a network storage location 116. Furthermore, and as further described herein below, the first compute instance 102*a* can be configured with a logical permission(s) to access objects in the data storage resource 108. In comparison, the second compute instance 102*b* may not be configured with such logical permission(s).

The compute instances 102*a-b* can be cloud-based instances such as virtual machines. In some examples, the second compute instance 102*b* may not be persistent. That is, the second compute instance 102*b* may only be instantiated by the first compute instance 102*a* in response to the user device 106 sends a request for an action to be performed. The first compute instance 102*a* may terminate the second compute instance 102*b* after the action is performed (or the second compute instance 102*b* can be configured to automatically terminate upon performing the action and reporting an outcome of this performance to the first compute instance 102*a*). In some examples, the first compute instance 102*a* may have a separate ownership than the first compute instance 102*b*. That is, the functions, operations, services data, etc. performed by or accessed by the first compute instance 102*a* may be configured and maintained by different entities than the second compute instance 102*b*. This can provide an additional layer of security that can increase difficulty for malicious entities attempting to exfiltrate data from the computing environment 100. Ownership can be defined using tenancies or accounts. In particular, the first compute instance 102*a* (or, similarly, the first private network 104*a*) can be registered with a first tenancy (or a first account) of a first entity. In comparison, the second compute instance 102*b* (or, similarly, the second private network 104*b*) can be registered with a second tenancy (or a second account) of a second entity. None of the first compute instance 102*a* and second compute instance 102*b* (or, similarly, the first private network 104*a* and the second private network 104*b*) may support a multi-tenancy configuration.

In some examples, the user device 106 can transmit a request to the first compute instance 102*a* via the API 110. The request can involve performing an action with respect to an object 118 stored in the data storage resource 108. In the example depicted in FIG. 1, the action can be retrieving the object 118 for the user device 106 (e.g., the object 118 can be a data object, in which case the action can be a data read). In other examples, the request may involve writing data to the data storage resource 108 or performing other file operations. In some examples, the action may involve any other, non-data related action taken with respect to an element of a virtual resource. For example, the action may involve launching a compute instance for the user device 106 and configuring the compute instance according to the request. In another example, the action may involve modifying a network configuration for the user device 106.

Returning to the example depicted in FIG. 1, the first compute instance 102*a* may receive the request from the user device 106 to retrieve the object 118 stored in the data storage resource 108. The first compute instance 102*a* can interact with the user device 106 and can also execute authentication and authorization actions. For example, the first compute instance 102*a* can authenticate account information (e.g., a username and password, or a secret and identifier of an account already set up) provided by the user device 106 in the request. If the account information is authenticated and authorized, the first compute instance 102*a* can call the credential generator 112 to generate a credential that provides permission to access the object 118. Generally, when an account is initially set up, the account can represent or be part of a tenancy. Access controls can be configured for the account. For example, a portion of the data storage resource 108 can be configured for the account such that a plurality of objects can be stored in the data storage resource 108 and be accessed based on the account information. At the setup time, a general credential can be created and can represent logical permission for such an access. The general credential may be a same credential for all tenants in the tenancy, or can be a per-tenant credential. In either case, the general credential can be scoped down at runtime (e.g., when the request is received from the user device 106).

At runtime, in response to the request from the user device 106 to access the object 118 (an example of the plurality of objects), the first compute instance 102*a* calls the credential generator 112 using at least some of the account information and receives back the general credential. Next, the first compute instance 102*a* generates a new credential, which is a scoped down version of the general credential. Alternatively, the credential generator 112 can generate the scoped credential (e.g., based on a policy passed by the first compute instance 102*a*). The scoping can limit the logical permission to accessing the object 118 only and can constraint this access ephemerally (e.g., in time and/or number of uses). For example, the credential generated by the first compute instance 102*a* or the credential generator 112 may enable retrieval of the object 118 from the data storage resource 108 but may not enable retrieval of any other data stored in the data storage resource 108. The credential may also expire after a time interval, such as after fifteen minutes. Although the first compute instance 102*a* and/or the credential generator 112 can generate the credential, the first compute instance 102*a* may not have network access to the data storage resource 108.

Therefore, the first compute instance 102*a* can instantiate the second compute instance 102*b* in the second virtual private network 104*b* and can provide the credential to the second compute instance. The second compute instance 102*b* may be instantiated solely to perform the requested action and can have network access to the data storage resource 108. For example, the second compute instance 102*b* can use the credential to retrieve the object 118 from the data storage resource 108, as long as the credential has not yet expired.

The object 118 may be encrypted. In some examples, the user device 106 may not have a first encryption key needed to decrypt the object 118. The second compute instance 102*b* may have permission (e.g., provided by the credential) to access a key management system 114 to decrypt the object 118, where the key management system 114 can receive the object 118, perform the decryption thereon using the first cryptographic key, and return the object 118 (decrypted) to the second compute instance 102*b*. In some examples, the key management system 114 and/or the second compute instance 102*b* can implement an access control group 115 that can define access privileges. For example, the access control group 115 can identify the second compute instance 102*b* as being permitted to have access to the data storage resource 108, the key management system, and/or the network storage location 116. The second compute instance 102*b* can then re-encrypt the object 118 using a second cryptographic key that is known to the user device 106 (or that has a corresponding key known to the user device 106 in the case of asymmetric encryption). To securely provide the object 118 to the user device 106 to fulfill the request, the second compute instance 102*b* can store the re-encrypted object 118 in a network storage location 116 that is separate from the data storage resource 108. As the second compute instance 102*b* is only instantiated to perform a requested action, the second compute instance 102*b* can be terminated after the object 118 is stored in the network storage location 116.

Before termination, the second compute instance 102*b* can transmit a response to the first compute instance 102*a* that the action has been performed. The first compute instance 102*a* can then send a notification to the user device 106 that the action has been performed. The notification may also provide a means for the user device 106 to access the object 118. For example, the notification may include a pre-signed URL that can grant temporary access to the location of the object 118 in the network storage location 116. The pre-signed URL may only be valid for a set amount of time, such as one minute.

The computing environment 100 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the computing environment 100 in FIG. 1 should be taken as being illustrative in nature, and not limiting to the scope of the disclosure.

Figure 2:
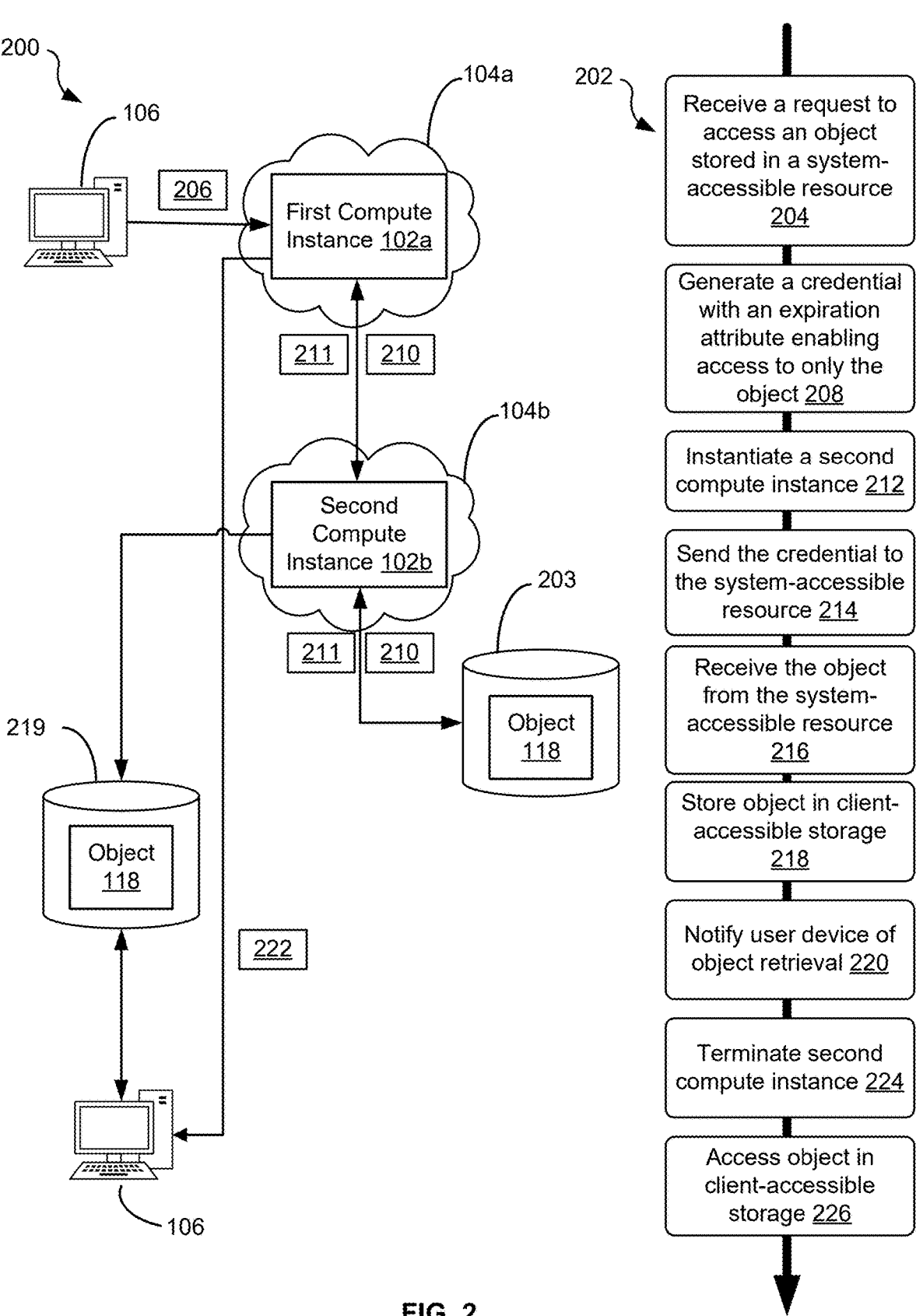
FIG. 2 illustrates an example block diagram and corresponding flow of a process for providing access to an object stored in backend storage, according to an embodiment of the present disclosure.

FIG. 2 illustrates an example block diagram 200 and corresponding flow of a process 202 for providing access to an object 118 stored in backend storage, according to an embodiment of the present disclosure. The process 202 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the process (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory. Some of the components of FIG. 2 may be described in reference to components of FIG. 1.

In some examples, the user device 106, the first compute instance 102*a*, the second compute instance 102*b*, the data storage resource 108, the user device 902, the web server 906, and/or the application server 908 may perform the process 202 of FIG. 2.

In an example, the process 202 may include operation 204, where the first compute instance 102*a* can receive a request 206 from the user device 106 to access an object 118 stored in a system-accessible resource 203 (e.g., the data storage resource 108 of FIG. 1). In some examples, the system-accessible resource 203 may serve multiple tenants. A tenant can be a user or a group of users (e.g., an organization associated with the user device 106) that can share common access to and privileges within the system-accessible resource 203 (e.g., on a single instance). However, the data for each tenant may be isolated from other tenant's data. The request 206 may indicate the tenant that is requesting the object 118 and an object identifier for the object 118. The first compute instance 102*a* can use the tenant information and the object identifier to identify the location of the object 118 (e.g., in the system-accessible resource 203). Or, in some examples, the request 206 may indicate the location of the object 118.

In an example, the process 202 may include operation 208, where the first compute instance 102*a* can generate a credential 210 with an expiration attribute. This credential 210 can be a scoped down and ephemeral version of a general credential associated with tenancy. The credential 210 can enable access to only the object 118 in the system-accessible resource 203. For example, the credential 210 can include a username and password associated with the user device 106 and the tenancy for which the object 118 is stored. The first compute instance 102 can also generate configuration information 211 that may include non-sensitive information such as the object identifier and storage location of the object 118. In some examples, the first compute instance 102*a* may encrypt the credential 210. The expiration attribute may cause the credential 210 to expire after an amount of time, such as five minutes.

In an example, the process 202 may include operation 212, where the first compute instance 102*a* can instantiate the second compute instance 102*b*. The second compute instance 102*b* may only be instantiated to perform an action, such as retrieving the object 118 for the user device 106. The second compute instance 102*b* may be in the second virtual private network 104*b* that can provide network access to the system-accessible resource 203. The first compute instance 102*b* may transmit the encrypted credential 210 and the configuration information 211 to the second compute instance 102*b*. The second compute instance 102*b* may not have network or logical access to services required to generate the credential 210.

In an example, the process 202 may include operation 214, where the second compute instance 102*b* can present the credential 210 to the system-accessible resource 203. The second compute can decrypt the encrypted credential 210 and can identify (based on the configuration information 211) which system-accessible resource 203 is storing the object 118. The second compute instance 102*b* can transmit the credential 210, such as via an application-programming interface call, to the system-accessible resource 203 as a request to receive the object 118. The system-accessible resource 203 can authenticate and authorize the request based on the username and password included in the credential 210 and associated with the tenancy. The system-accessible resource 203 can also validate that the request is received via the second virtual private network 104*b*.

In an example, the process 202 may include operation 216, where the second compute instance 102*b* can receive the object 118 from the system-accessible resource 203, such as in response to an application-programming interface call. The object 118 may in some examples be encrypted. The second compute instance 102*b* may cause the object 118 to be decrypted using cryptographic information included in the configuration information 211. For example, the second compute instance 102 sends the object 118 along with the cryptographic information (or user account information) and the credential 210 to a key management system. This system then determines the relevant encryption key to use and accordingly decrypt and return the object 118 (decrypted) to the second compute instance 102*b*. In turn, the second compute instance 102*b* may re-encrypt the object 118 using a cryptographic key associated with the user device 106.

In an example, the process 202 may include operation 218, where the second compute instance 102*b* can store the object 118 in a client-accessible storage 219 (e.g., the network storage location 116 of FIG. 1). The client-accessible storage 219 may be accessible to the user device 106, and the object 118 stored in the client-accessible storage 219 can be the re-encrypted object that is encrypted using the cryptographic key associated with the user device 106. The client-accessible storage 219 may not be accessed by the first compute instance 102*a* in the first virtual private network 104*a*. Neither the first compute instance 102*a* nor the second compute instance 102*b* may send the object 118 directly to the user device 106. Once the second compute instance 102*b* stores the object 118 in the client-accessible storage 219, the second compute instance 102*b* can send an indication to the first compute instance 102*a* that the action requested by the user device 106 has been performed.

In an example, the process 202 may include operation 220, where the first compute instance 102*a* can send a notification 222 to the user device 106 indicating that the object 118 has been retrieved. In some examples, the notification 222 may include a means by which the user device 106 can access the retrieved object 118, such as with a pre-signed URL that may expire after one minute. The pre-signed URL may be the address for the storage location of the object 118 in the client-accessible storage 219. In an example, the process 202 may include operation 224, where the first compute instance 102*a* can terminate the second compute instance 102*b*, or the second compute instance 102*b* can automatically self-terminate after the second compute instance 102*b* transmits the indication that the action has been performed. Thus, the second compute instance 102*b* may only be instantiated for an amount of time required to perform the action.

In an example, the process 202 may include operation 226, where the user device 106 can access the object 118 in the client-accessible storage 219. For example, the user device 106 may use the pre-signed URL to open a webpage from which the object 118 can be downloaded. If the user device 106 does not use the pre-signed URL before expiration, the user device 106 may be unable to access the object 118 from the client-accessible storage 219.

Figure 3:
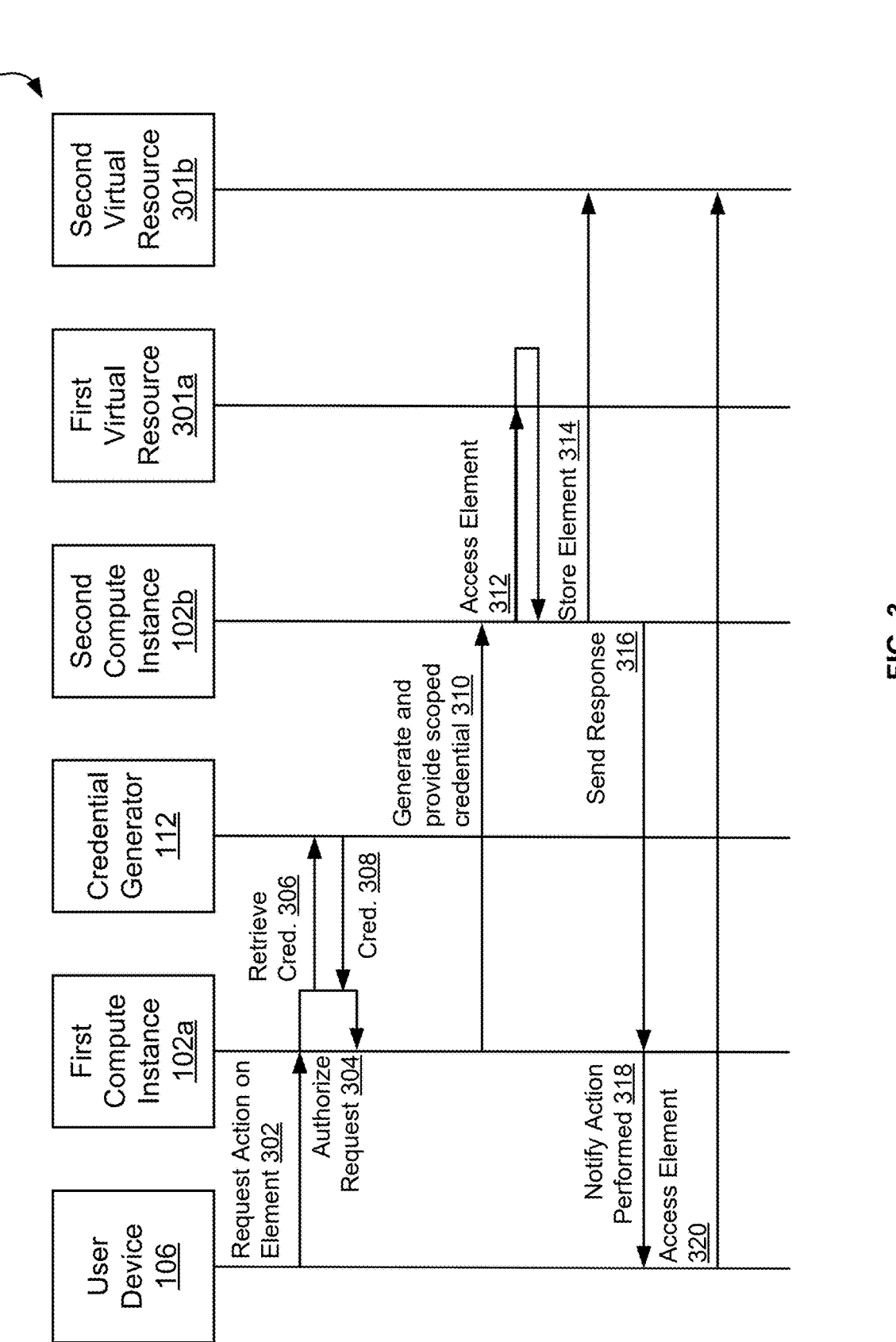
FIG. 3 illustrates a sequence diagram of a process for providing access to an object stored in backend storage, according to an embodiment of the present disclosure.

FIG. 3 illustrates a sequence diagram of a process 300 for providing access to an object stored in backend storage, according to an embodiment of the present disclosure. The process 300 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the process (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory. Some of the components of FIG. 3 may be described in reference to components of FIG. 1-2.

In an example, the process 300 may include operation 302, where the user device 106 can request an action to be performed on an element of a first virtual resource 301*a*. The user device 106 can send such a request 206 to the first compute instance 102*a*. In some examples, the element may be a file or any other form of data, the virtual resource may be a table or data store, and the action may involve retrieving, modifying, or storing the file in the first virtual resource 301*a*. In another example, the action may be any other type of operation that can be performed by the second compute instance 102*b*. For example, the action may involve reconfiguring an element that is a configuration setting of a virtual resource such as a virtual machine or container. In the example depicted in FIG. 3, the action may involve retrieving an element from the first virtual resource 301*a*.

In an example, the process 300 may include operation 304, where the first compute instance 102*a* can authorize the request 206 received from the user device 106. For example, the request can include, in addition to an identifier of the object, account information (e.g., username and password). The first compute instance 102*a* can access an account authenticator (e.g., which may include the credential generator 112) that stores predefined account information. Based on a match between the account information and the predefined account information, the account authenticator can return a response indicating that the user device 106 is authenticated. Furthermore, the first compute instance 102*a* can pre-store mapping information that associates the authenticated account information with virtual resources. The virtual resources can include the virtual resource, and thereby, the request 206 can be authenticated based on the mapping. Next, the first compute instance 102*a* can call at operation 306 the credential generator 102*a* by passing thereto the account information. In response, the first compute instance 102*a* can receive, at operation 308, a credential indicating a logical permission for the account information to access the virtual resource (or a portion thereof) that includes the element. These two operations can be suboperation of the request authorization operation 304, or can be separate therefrom. If the user device 106 is not authorized to access the element, the first compute instance 102a may not fulfill the request 206.

Figure 4:
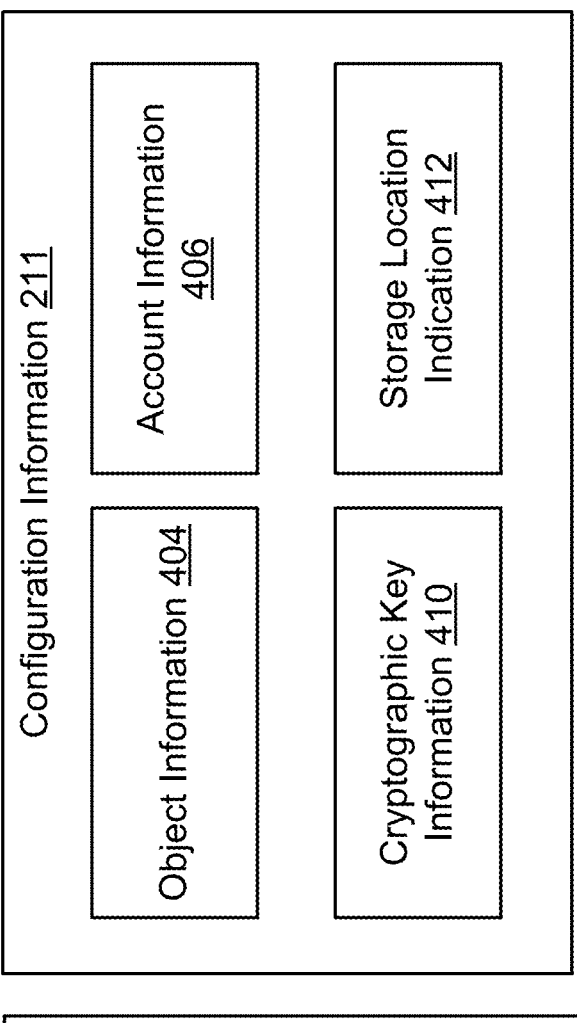
FIG. 4 illustrates a credential and configuration information enabling access to an element of a virtual resource, according to an embodiment of the present disclosure.

In an example, the process 300 may include operation 310, where the first compute instance 102a can generate a credential 210 based on the general credential received from the credential generator 112. This credential 210 can indicate a limited logical permission (e.g., constrained to the element and having an ephemeral attribute), such as with a username and password. Alternatively, the credential generator 112 may generate the credential 210 with the limited logical permission. The first compute instance 102a can also generate configuration information 211 that includes the an identity of the object, a location of the object, and account information. The credential 210 may be ephemeral, such that the username and password and/or the limited logical permission may only be usable until the time interval expires. One example of the credential 210 and configuration information 211 is depicted in FIG. 4. The description of remaining operations of the process 300 continues after the description of FIG. 4.

FIG. 4 illustrates a credential 210 and configuration information 211 enabling access to an element of a virtual resource, according to an embodiment of the present disclosure. The credential 210 can include a policy 402 indicating an action that is permissible to be performed on the element, such as retrieving an object from a data storage resource and an expiration attribute 408 can define an amount of time that the credential 210 can be used to access the object. Alternatively, the expiration attribute 408 can define a number of times that the credential 210 can be used to access the object. The configuration information 211 can include object information 404, account information 406, cryptographic key information 410, and a storage location indication 412 (e.g., the network storage location 116, the client-accessible storage 219, or the second virtual resource 301b) at which the object is to be stored. The object information 404 may include an object identifier and a storage location of the object. The cryptographic key information 410 can include information that enables key management system to identify a cryptographic key associated with the tenancy of the object. For example, the object may be encrypted within the first virtual resource 301a, the data storage resource 108, or the system-accessible resource 203 using the first cryptographic key. In some examples, the user device 106 may not have access to the first cryptographic key. In some examples, the credential 210 may additionally include a location attribute 409. The location attribute 409 can limit use of the credential 210 to a particular region, such as to a country or a portion of a network.

Referring back to FIG. 3, the operation 310 can further include the first compute instance 102a providing the credential 210 and the configuration information 211 to the second compute instance 102b after instantiating the second compute instance 102b. The credential 210 may, in some examples, be encrypted with a cryptographic key that is accessible to the second compute instance 102b.

In an example, the process 300 can include operation 312, in which the second compute instance 102b can access the element that was requested by the user device 106. The second compute instance 102b may decrypt the credential 210, which may cause the second compute instance 102b to perform the action outlined by the policy 402 (e.g., accessing the element from the first virtual resource 301a). For example, if the credential 210 has not yet expired, the second compute instance 102b may make an application-programming interface call to the first virtual resource 301a to request the element. The application-programming interface call may include the username and password and identify the element. If the first virtual resource 301a authenticates the username and password, the first virtual resource 301a can return the element to the second compute instance 102b. In an example, the second compute instance 102b may decrypt the element using the first cryptographic key in the configuration information 211 (e.g., by calling the key management system, providing it with the cryptographic key information 410 and the element, and receiving back the element after the element is decrypted by the key management system; or by providing the cryptographic key information 410 to the key management system and receiving back the encryption key to use to decrypt the element). The second compute instance 102b may re-encrypt the element using another cryptographic key that is accessible to the user device 106.

In an example, the process 300 can include operation 314, in which the second compute instance 102b can store the element in a second virtual resource 301b that is separate from the first virtual resource 301a. The second virtual resource 301b may be inaccessible to the first compute instance 102a as well. In an example, the process 300 can include operation 316, in which the second compute instance 102b can send a response to the first compute instance 102a indicating that the action (e.g., storing the element in the second virtual resource 301b) has been successfully performed.

In an example, the process 300 can include operation 318, in which the first compute instance 102a can notify the user device 106 of the action that was performed. Additionally, the first compute instance 102a can terminate the second compute instance 102b once the action is performed. This can prevent persistent access by the second compute instance 102b to data in backend storage outside of a single, requested action. The first compute instance 102a can additionally send a storage location (e.g., the second virtual resource 301b) to the user device 106. In an example, the process 300 can include operation 320, in which the user device 106 can access the element from the storage location. In some examples, the user device 106 may have time-limited access to the storage location.

FIG. 5 illustrates an example flow of a process 500 enabling access to an object stored in a data storage resource, according to an embodiment of the present disclosure. The process 500 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the process 500 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

In the description below, various components are described. These components can include the user device 106, the first compute instance 102a, the second compute instance 102b, the data storage resource 108, the user device 902, the web server 906, and/or the application server 908.

In an example, the process 500 can involve a first compute instance of a system receiving, from a user device, a request to access an object stored in a data storage resource. The first compute instance may be included in a first private network of a virtualized network and may be associated with a logical permission to access the data storage resource. The first compute instance may lack network access to the data storage resource itself. In some examples, the request may include object information associated with the object and account information associated with the user device.

In an example, the process 500 can involve the first compute instance generating a credential that enables the access to only the object. The credential can have an expiration attribute. The credential can be generated at runtime based at least in part on the request and the logical permission. The first compute instance may generate a policy indicating that accessing the object prior to an expiration of a first time interval is permitted. The object information can be included in configuration information generated by the first compute instance.

In an example, the process 500 can involve the first compute instance instantiating a second compute instance of the system at the runtime and based at least in part on the request. The second compute instance can be included in a second private network of the virtualized network. The second compute instance can have network access to the data storage resource and can be associated with an ownership separate from that of the first compute instance and the data storage resource. In an example, the process 500 can involve the first compute instance providing the credential and the configuration information to the second compute instance.

In an example, the process 500 can involve the second compute instance retrieving the object from the data storage resource based at least in part on the credential, the configuration information, and the network access. For example, the second compute instance can present the credential to the data storage resource. The second compute instance can receive the object from the data storage resource based at least in part on the credential. In some examples, the second compute instance may cause the object to be decrypted based at least in part of a first cryptographic key. The second compute instance may access the first cryptographic key based on cryptographic information included in the configuration information. After the object is decrypted, the second compute instance can encrypt the data from the object.

In an example, the process 500 can involve the second compute instance storing data from the object at a network storage location that is accessible to the user device. The data can be stored at the network storage location after the network storage location after the data is encrypted. The second compute instance can then send a response to the first compute instance indicating that the data was stored. This can cause the first compute instance to terminate the second compute instance based at least in part on the data being stored. Then, the first compute instance can send an indication of the network storage location to the user device. The indication may expire after a second time interval.

FIG. 6 illustrates an example flow of a process 600 performed by a first compute instance to enable access to an element of a virtual resource, according to an embodiment of the present disclosure. The process 600 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the process 600 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

In the description below, various components are described. These components can include the user device 106, the first compute instance 102a, the second compute instance 102b, the data storage resource 108, the user device 902, the web server 906, and/or the application server 908.

In an example, the process 600 can involve operation 602, in which the first compute instance receiving a request from a user device to retrieve a data object from a datastore. The first compute instance may be executing in a first virtual private network of a virtualized network. The first virtual private network may provide the first compute instance access to network access to services or data that can be used to generate logical permissions to use the datastore but may lack network access to the datastore itself.

In an example, the process 600 can involve operation 604, in which the first compute instance can generate a credential that enables access to only the data object in the datastore. The credential can be generated at runtime in response to receiving the request. The credential can enable the action to be performed only on the data object and can expire after a set amount of time (e.g., five minute) or after a set number of uses (e.g., two uses). The first compute instance can generate the credential to indicate a logical permission limited to accessing the data object and to be ephemeral. The credential can be generated, upon authentication of the request, from a general credential that provides permits access to the datastore. using information stored by the first compute instance.

In an example, the process 600 can involve operation 606, in which the first compute instance can encrypt the credential. The first compute instance can encrypt the credential using an encryption key that is associated with the first compute instance and the second compute instance. The encryption key may be dictated by the information stored by the first compute instance. For example, the first compute instance may consult a lookup table mapping the encryption key to the user device. In some examples, the first compute instance can additionally encrypt the configuration information. Alternatively, the configuration information can be a plain text file.

In an example, the process 600 can involve operation 608, in which the first compute instance can instantiate a second compute instance that has network access to the datastore. The second compute instance can be instantiated at runtime in response to the request being received. That is, the second compute instance may not be instantiated prior to the first compute instance receiving the request. The instantiation can include providing the credential to the second compute instance. The second compute instance can decrypt the credential. Because the second compute instance has network access as well as the credential that grants logical access to the data object in the datastore, the second compute instance can perform the action requested by the user device (e.g., retrieving the data object from the datastore for the user device).

In an example, the process 600 can involve operation 610, in which the first compute instance can receive, from the second compute instance, an indication that the data object has been retrieved. The data object may have been stored by the second compute instance in a second datastore that is accessible to the user device. The first compute instance may not have network access and/or logical permission to access the second datastore, and in some examples may not directly send the data object to the user device.

In an example, the process 600 can involve operation 612, in which the first compute instance can send a response to the user device with a URL that provides of the storage location that stores the retrieved data object. The response can indicate that the action has been performed and can be generated in response to receiving the indication from the second compute instance that the data object has been retrieved. The URL can expire after a time interval (e.g., one minute) and can be used by the user device to access the second datastore to retrieve the data object before expiration.

In an example, the process 600 can involve operation 614, in which the first compute instance can terminate the second compute instance in response to receiving the indication that the second compute instance has performed the action (e.g., retrieved the data object and stored the data object in the second datastore). In other examples, the second compute instance may self-terminate after sending the indication to the first compute instance. Thus, the second compute instance may only be executed for the time it takes to complete a requested action and may not be instantiated when an action has not been requested. This can increase security of the computing environment, as only the second compute instance may have network access to the datastore.

FIG. 7 illustrates an example flow of a process 700 performed by a second compute process to enable access to an element of a virtual resource, according to an embodiment of the present disclosure. The process 700 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the process 700 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

In the description below, various components are described. These components can include the user device 106, the first compute instance 102a, the second compute instance 102b, the data storage resource 108, the user device 902, the web server 906, and/or the application server 908.

In an example, the process 700 can include operation 702, which can involve the second compute instance decrypting a credential received from the first compute instance that enables access to a data object in a datastore. The second compute instance may be instantiated by the first compute instance in response to receiving a request to access the data object in the datastore. As part of or subsequent to the instantiation, the first compute instance can provide the credential to the second compute instance. The credential can include a policy indicating the data object and indicating what action is to be permitted on only the data object (e.g., retrieving the data object from the datastore and storing the data object in a second datastore accessible to the user device). In some examples, the credential may be encrypted, and the second compute instance may decrypt the credential to access the information in the credential The username and password may be included in the credential received from the first compute instance.

In an example, the process 700 can include operation 704, which can involve the second compute instance sending the credential and an identifier (e.g., from the configuration information) to the datastore. For example, the configuration information can include, among other things, an identifier of the data object, a location of the data object, and a policy indicate the action permitted to be performed on the data object. The datastore can use the credential to authenticate and authorize the request, determine the data object based on the identifier, and determine that the action is permitted. In an example, the process 700 can include operation 706, which can involve the second compute instance receiving the data object from the datastore in response to sending the credential. In some examples, the data object may be encrypted.

In an example, the process 700 can include operation 708, which can involve the second compute instance decrypting the data object using a first cryptographic key. The first cryptographic key can be associated with the first compute instance and the second compute instance and may not be exposed to or accessible by the user device. The second compute instance can identify the first cryptographic key based on the cryptographic information stored in the the configuration information (e.g., by calling a key management system) and perform the decryption. Or the second compute instance can send the cryptographic information and the encrypted data object to the key management system and receive back the decrypted data object. After decrypting the data object, the second compute instance can retrieve the data from the data object. In some examples, this data may be plain-text data included in the data object.

In an example, the process 700 can include operation 710, which can involve the second compute instance encrypting the data from the decrypted data object using a second cryptographic key. In some examples, the second cryptographic key may be associated with a separate ownership than the first cryptographic key. The second compute instance can determine the second cryptographic key from the cryptographic information included in the configuration information provided by the first compute instance. The second cryptographic key may be a public key that is associated with the user device. That is, the user device may also have access to the second cryptographic key. Re-encrypting the data from the data object can increase security for performing the action by ensuring that unencrypted data is never transmitted as part of performing the action.

In an example, the process 700 can include operation 712, which can involve the second compute instance storing the encrypted data from the data object at another storage location accessible to the user device, such as the second datastore. In some examples, the second datastore may only be temporarily accessible to the user device (e.g., via the ephemeral URL provided by the first instance to the user device). The second database may not be accessible to the first compute instance.

In an example, the process 700 can include operation 714, which can involve the second compute instance sending a response to the first compute instance indicating that the encrypted data from the data object was stored in the location accessible to the user device. In an example, the process 700 can include operation 716, which can involve the second compute instance being terminated (e.g., by the first compute instance in response to the first compute instance receiving the response indicating that the action was performed, or by the second compute instance after sending the response to the first compute instance).

Figure 8:
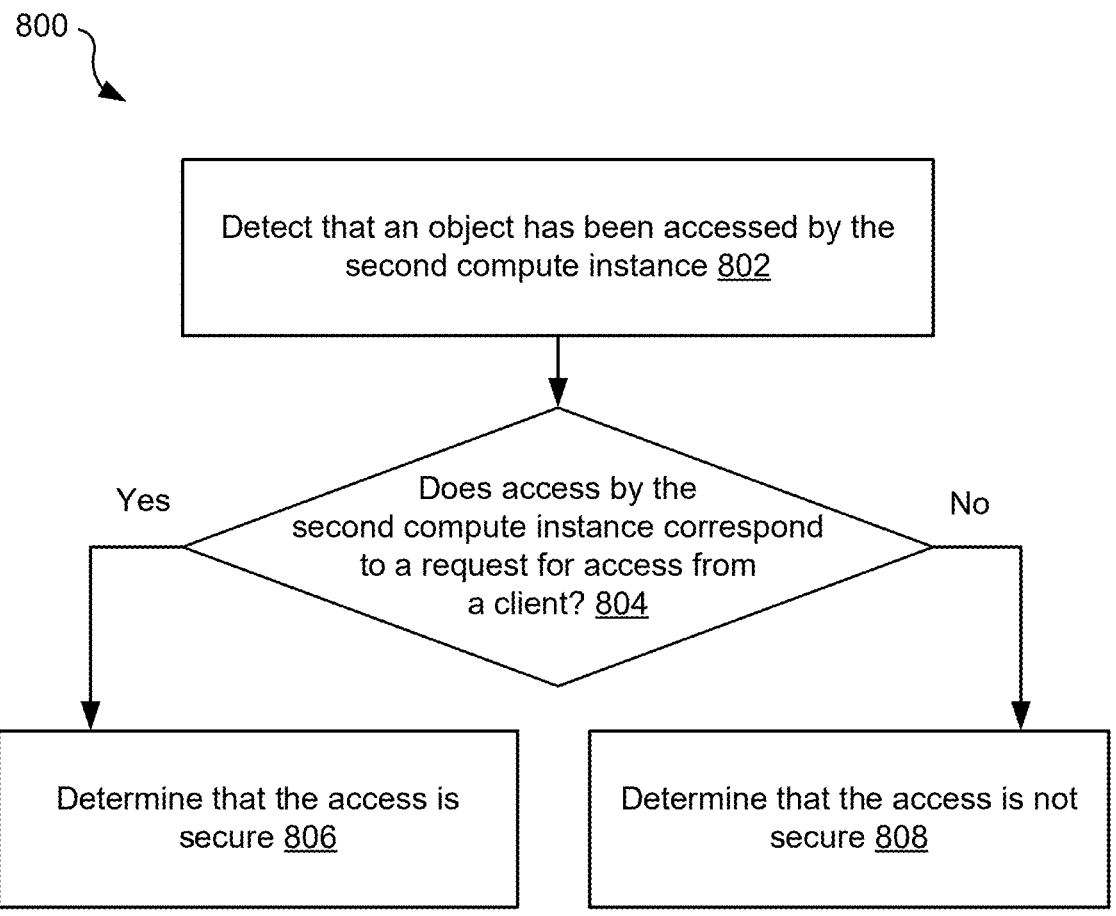
FIG. 8 illustrates an example flow of a process for detecting fraud for a request to access an element of a virtual resource.

FIG. 8 illustrates an example flow of a process 800 for detecting fraud for a request to access an element of a virtual resource. The process 800 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the process 800 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

In the description below, various components are described. These components can include the user device 106, the first compute instance 102*a*, the second compute instance 102*b*, the data storage resource 108, the user device 902, the web server 906, and/or the application server 908.

In an example, the process 800 can include operation 802, which can involve a fraud service executing on a computer system detecting that an object has been accessed by the second compute instance. This access can involve the second compute instance moving, storing, retrieving, modifying, or performing any other suitable action with respect to the object. The object may be securely stored in a datastore and may only be accessed by an entity with both network access to the datastore and logical permission to access the object (e.g., by providing credentials associated with the object). The second compute instance may have network access to the datastore but may not request or independently retrieve logical permissions to access the object. Therefore, the second compute instance may only access the object if another entity, such as a first compute instance, provides credentials for accessing the object to the first compute instance.

In an example, the process 800 can include operation 804, which can involve the fraud service determining if the access of the object by the second compute instance corresponds to a request for access from a client (e.g., a user device). For example, the fraud service can access a log of requests received by the first compute instance. The fraud service can determine if the log includes a request from the user device for the action that is being performed by the second compute instance. If such a request is identified, the fraud service can further determine if the object access corresponds to the request by determining if policies generated by the first compute instance for the request match the scope of the request. That is, the only credentials generated for the request should be to enable performance of the single action on the single object. If the object access corresponds to the request, the process 800 can continue to operation 806. If the object access does not correspond to a request (e.g., by not having a corresponding request in the log, or by corresponding to a request but having credentials granting permission outside the scope of the request), the process 800 can continue to operation 808.

In an example, the process 800 can include operation 806, which can involve the fraud service determining that the access is secure based on determining that the access of the object corresponds to the request for access sent by the user device. This can indicate that the second compute instance was properly accessing the object in response to a request received from an authorized user device. The user device may have been authenticated by the first compute instance before the first compute instance directed the second compute instance to access the object.

In an example, the process 800 can include operation 808, which can involve fraud service determining that the access is not secure. This can indicate that a malicious entity has improperly caused the second compute instance to access the object, or to access more objects than was properly authorized. The fraud service can notify suitable devices of a security breach and, in some examples, can prevent further access to the object or the datastore. For example, the second compute instance can be automatically terminated to prevent further malicious activities.

Figure 9:
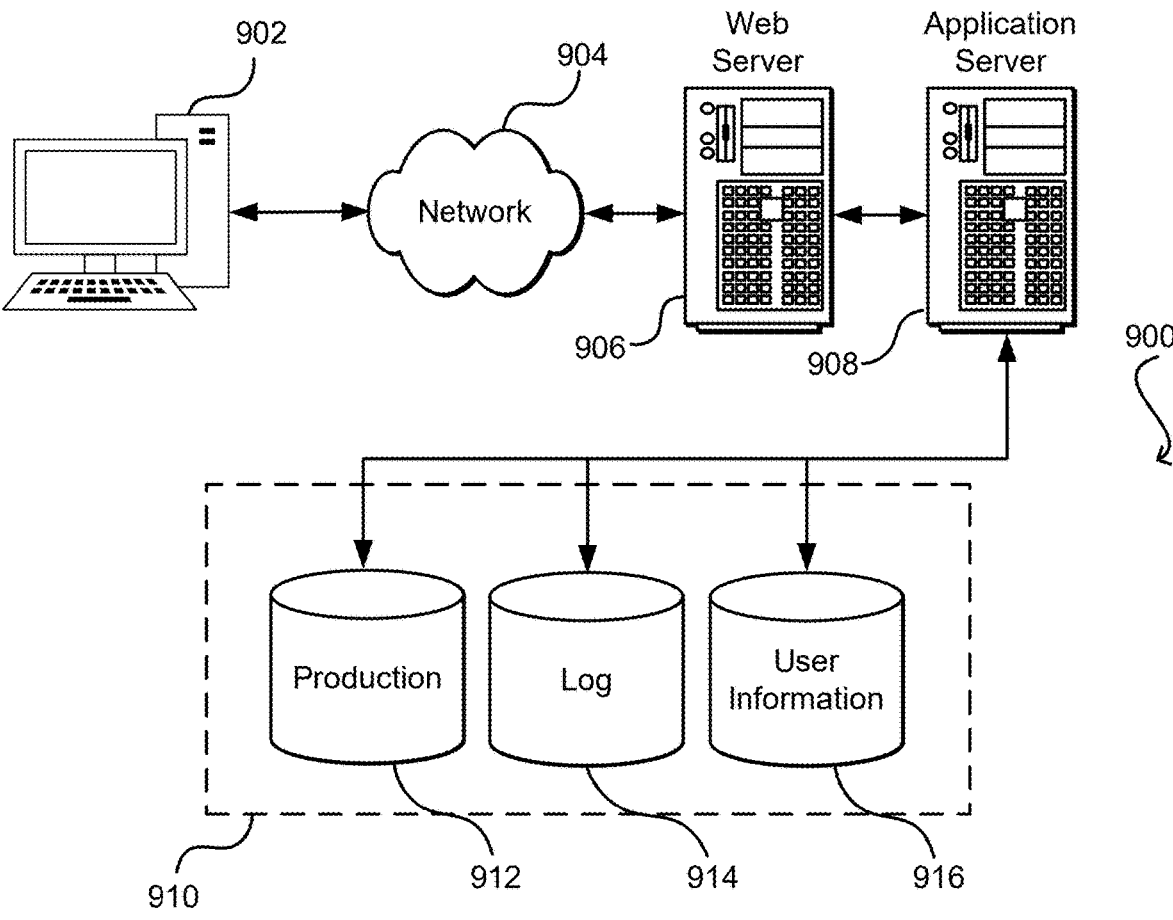
FIG. 9 illustrates an environment in which various embodiments can be implemented.

FIG. 9 illustrates an environment 900 in which various embodiments can be implemented. As will be appreciated, although a Web-based environment is used for purposes of explanation, different environments may be used, as appropriate, to implement various embodiments. The environment includes a user device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the user device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a result listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the environment 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:

one or more processors; and one or more memory storing instructions that, upon execution by the one or more processors, configure the system to:

receive, by a first compute instance of the system from a user device, a request to access an object stored in a data storage resource, the first compute instance included in a first private network of a virtualized network, associated with a logical permission to access the data storage resource, and lacking network access to the data storage resource;

cause, by the first compute instance, a credential to be generated that enables the access to only the object and that has an expiration attribute, the credential generated at runtime based at least in part on the request and the logical permission;

instantiate, by the first compute instance at the runtime and based at least in part on the request, a second compute instance of the system, the second compute instance included in a second private network of the virtualized network, having the network access to the data storage resource, and associated with an ownership separate from that of the first compute instance and the data storage resource;

provide, by the first compute instance, the credential to the second compute instance;

retrieve, by the second compute instance, the object from the data storage resource based at least in part on the credential and the network access; and store, by the second compute instance, data from the object at a network storage location accessible to the user device.

2. The system of claim 1, wherein the execution of the instructions further configures the system to:

determine, by the first compute instance and based at least in part on the request, object information associated with the object and account information associated with the user device;

generate, by the first compute instance, a policy indicating that accessing the object prior to an expiration of a first time interval is permitted;

include, by the first compute instance, the policy in the credential;

send, by the first compute instance, the object information and the account information in configuration information to the second compute instance;

receive, by the first compute instance, a response of the second compute instance indicating that the data was stored; and send, by the first compute instance to the user device, an indication of the network storage location, wherein the indication expires after a second time interval.

3. The system of claim 1, wherein the execution of the instructions further configures the system to:

send, by the second compute instance, the credential to the data storage resource;

receive, by the second compute instance from the data storage resource, the object based at least in part on the credential;

cause, by the second compute instance, the object to be decrypted based at least in part on a first cryptographic key; and encrypt, by the second compute instance based at least in part on a second cryptographic key, the data from the object after the object is decrypted, wherein the data is stored at the network storage location after the data is encrypted, and wherein the second compute instance is terminated based at least in part on the data being stored.

4. The system of claim 1, wherein the execution of the instructions further configures the system to:

determine a correspondence between an access to the object by the second compute instance and the request received by the first compute instance; and determine that the access is secure based at least in part on the correspondence.

5. A method implemented by a system, the method comprising:

receiving, by a first compute instance of the system from a user device, a request indicating an action to be performed on an element of a virtual resource, the first compute instance associated with a logical permission to use the virtual resource, and lacking network access to the virtual resource;

causing, by the first compute instance, a credential to be generated that enables the action to be performed on the element only and that has an expiration attribute, the credential generated at runtime based at least in part on the request and the logical permission;

providing, by the first compute instance, the credential to a second compute instance of the system, the second compute instance having the network access to the virtual resource and lacking the logical permission to generate the credential; and causing, by the second compute instance, the action to be performed based at least in part on the credential and the network access.

6. The method of claim 5, wherein the element includes an object stored in a data storage resource, and further comprising:

instantiating, by the first compute instance at the runtime and based at least in part on the request, the second compute instance;

retrieving, by the second compute instance, the object from the data storage resource based at least in part on the credential and the network access; and storing, by the second compute instance, data from the object at a network storage location accessible to the user device.

7. The method of claim 5, further comprising:

instantiating the second compute instance based at least in part on the credential being generated; and terminating the second compute instance based at least in part on the action being performed.

8. The method of claim 5, further comprising:

instantiating the second compute instance, wherein the first compute instance is included in a first private network of a virtualized network, wherein the second compute instance is included in a second private network of a virtualized network, and wherein the first private network is associated with an ownership account different from that of the second private network.

9. The method of claim 5, further comprising:

including, by the first compute instance in the credential, an indication that the action is to be permitted on only the element and the expiration attribute.

10. The method of claim 9, further comprising:

sending, by the first compute instance, the credential and configuration information including cryptographic key information associated with securing the element to the second compute instance.

11. The method of claim 5, further comprising:

storing, by the first compute instance, configuration information that associates account information, cryptographic key information, the virtual resource, and a different virtual resource, wherein the credential is generated based at least in part on the configuration information.

12. The method of claim 11, wherein the credential is generated by at least limiting permission provided by the credential to only the element in the virtual resource indicating that the cryptographic key information is to be used in performing the action, and further comprising:

storing, as part of performing the action, data from the element in the different virtual resource.

13. One or more non-transitory computer-readable storage media storing instructions that, upon execution on a system, cause the system to perform operations comprising:

receiving, by a first compute instance of the system from a user device, a request indicating an action to be performed on an element of a virtual resource, the first compute instance associated with a logical permission to use the virtual resource, and lacking network access to the virtual resource;

causing, by the first compute instance, a credential to be generated that enables the action to be performed on the element only and that has an expiration attribute, the credential generated at runtime based at least in part on the request and the logical permission;

providing, by the first compute instance, the credential to a second compute instance of the system, the second compute instance having the network access to the virtual resource and lacking the logical permission to generate the credential; and causing, by the second compute instance, the action to be performed based at least in part on the credential and the network access.

14. The one or more non-transitory computer-readable storage media of claim 13, wherein the operations further comprise:

accessing, by the second compute instance, the element from the virtual resource based at least in part on the credential;

causing, based at least in part on cryptographic key information included in configuration information sent by the first compute instance, the element to be decrypted;

determining data from the element after the element is decrypted;

encrypting the data; and storing, in a different virtual resource accessible to the user device, the data after the data is encrypted.

15. The one or more non-transitory computer-readable storage media of claim 13, wherein the credential is a first credential, and wherein the operations further comprise:

retrieving, by the first compute instance, a second credential associated with the user device, the second credential permitting access to the virtual resource and defined prior to the request being received, wherein the first credential is generated based at least in part on the second credential and after the request is received permits use of only the element of the virtual resource.

16. The one or more non-transitory computer-readable storage media of claim 13, wherein the operations further comprise:

encrypting, by the first compute instance, the credential based at least in part on an encryption key associated with the user device.

17. The one or more non-transitory computer-readable storage media of claim 13, wherein the operations further comprise:

instantiating, by the first compute instance, the second compute instance based at least in part on the request, wherein the first compute instance is included in a first private network of a virtualized network, wherein the second compute instance is included in a second private network of the virtualized network, wherein the first private network is associated with the logical permission and lacks the network access, and wherein the second private network lacks the logical permission and is associated with the network access.

18. The one or more non-transitory computer-readable storage media of claim 13, wherein the operations further comprise:

sending, by the first compute instance to the user device, a response to the user device, the response including a first indication of a network location storing an outcome of performing the action, wherein the first compute instance does not send the outcome to the user device.

19. The one or more non-transitory computer-readable storage media of claim 18, further comprising:

receiving, by the first compute instance from the second compute instance, a second indication of the action being performed; and generating, by the first compute instance, the first indication based at least in part on the second indication.

20. The one or more non-transitory computer-readable storage media of claim 18, wherein the operations further comprise:

instantiating, by the first compute instance, the second compute instance based at least in part on the request; and terminating the second compute instance based at least in part on the action being performed.

* * * * *